United States Patent
Johnson et al.

(10) Patent No.: US 11,675,574 B2
(45) Date of Patent: *Jun. 13, 2023

(54) FRAMEWORK FOR USER-DIRECTED PROFILE-DRIVEN OPTIMIZATIONS

(71) Applicant: Google LLC, Mountain View, CA (US)

(72) Inventors: Teresa Louise Johnson, Los Gatos, CA (US); Xinliang David Li, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,119

(22) Filed: Mar. 17, 2022

(65) Prior Publication Data

US 2022/0206769 A1 Jun. 30, 2022

Related U.S. Application Data

(63) Continuation of application No. 16/524,929, filed on Jul. 29, 2019, now Pat. No. 11,321,061, which is a continuation of application No. 15/701,296, filed on Sep. 11, 2017, now Pat. No. 10,365,903, which is a continuation of application No. 13/855,557, filed on Apr. 2, 2013, now Pat. No. 9,760,351.

(51) Int. Cl.
*G06F 8/41* (2018.01)

(52) U.S. Cl.
CPC ............ *G06F 8/443* (2013.01); *G06F 8/4434* (2013.01); *G06F 8/4441* (2013.01)

(58) Field of Classification Search
CPC ....... G06F 8/443; G06F 8/4434; G06F 8/4441
See application file for complete search history.

(56) References Cited

U.S. PATENT DOCUMENTS

| | | |
|---|---|---|
| 8,387,026 B1 | 2/2013 | Hundt et al. |
| 8,627,300 B2 | 1/2014 | Kruglick |
| 8,635,606 B2 | 1/2014 | Kruglick |
| 2005/0050532 A1 | 3/2005 | Matsuyama |
| 2005/0086650 A1 | 4/2005 | Yates |
| 2005/0125784 A1 | 6/2005 | Yang et al. |
| 2006/0059474 A1 | 3/2006 | Bhansali et al. |

(Continued)

FOREIGN PATENT DOCUMENTS

| | | |
|---|---|---|
| CN | 102609351 A | 7/2012 |
| JP | H09330233 A | 12/1997 |

(Continued)

OTHER PUBLICATIONS

Invitation to Pay Additional Fees and, Where Applicable, Protest Fee mailed Jul. 17, 2014 for International Application No. PCT/US2014/032530.

(Continued)

*Primary Examiner* — Qing Chen
*Assistant Examiner* — Amir Soltanzadeh
(74) *Attorney, Agent, or Firm* — Lerner David LLP

(57) ABSTRACT

A method for using profiling to obtain application-specific, preferred parameter values for an application is disclosed. First, a parameter for which to obtain an application-specific value is identified. Code is then augmented for application-specific profiling of the parameter. The parameter is profiled and profile data is collected. The profile data is then analyzed to determine the application's preferred parameter value for the profile parameter.

20 Claims, 12 Drawing Sheets

(56) References Cited

U.S. PATENT DOCUMENTS

| | | |
|---|---|---|
| 2006/0242636 A1 | 10/2006 | Chilimbi et al. |
| 2008/0126867 A1 | 5/2008 | Pandarinathan et al. |
| 2008/0168433 A1 | 7/2008 | Arnold |
| 2008/0282232 A1 | 11/2008 | Cong et al. |
| 2009/0089805 A1 | 4/2009 | Srinivasan |
| 2010/0125838 A1 | 5/2010 | Kuusilinna |
| 2012/0278793 A1 | 11/2012 | Jalan et al. |
| 2014/0047420 A1 | 2/2014 | Pizlo |

FOREIGN PATENT DOCUMENTS

| | | |
|---|---|---|
| JP | H11149380 A | 6/1999 |
| JP | 2002099449 A | 4/2002 |
| KR | 20070038637 A | 4/2007 |

OTHER PUBLICATIONS

International Search Report for International Application No. PCT/US2014/032530 dated Sep. 12, 2014.
Written Opinion of International Searching Authority for International Application No. PCT/US2014/032530 dated Sep. 12, 2014.
Sato, et al., "Automatic Adaptive Performance Tuning Tool, TEA Expert", Research Report of Information Processing Society of Japan, Japan, Information Processing Society of Japan, Aug. 7, 1998, vol. 98, No. 72, pp. 13-18 (98-HPC-72-3) ISSN0919-6072.
Office Action dated Sep. 1, 2016 in European Patent Application No. 14724894.2 (4 pages).
Office Action dated Feb. 3, 2017 in European Patent Application No. 14724894.2 (3 pages).
Office Action dated Sep. 9, 2016 in Australian Patent Application No. 2014248296 (3 pages).
Office Action dated Jan. 20, 2017 in Korean Patent Application No. 10-2015-7030905 (16 pages).
Notice of Allowance dated Apr. 28, 2017 in Korean Patent Application No. 10-2015-7030905.
Arnold, Matthew. "Online profiling and feedback-directed optimization of java", PhD Thesis. Rutgers, The State University of New Jersey, 2002.
Patent Examination Report No. 1 dated Jun. 3, 2016 in corresponding Australian Application No. 2014248296.
Office Action dated Oct. 18, 2016 in corresponding Japanese Patent Application No. 2016-506373.
Office Action dated Oct. 20, 2016 in corresponding Korean Patent Application No. 10-2015-7030905.
Kishnaswamy, A. et al., "Profile Guided Selection of ARM and Thumb Instructions", Association for Computing Machinery, ACM Press, vol. 37, No. 7, Jul. 1, 2002, pp. 56-64.
Ramasamy, V. et al., Feedback-directed Optimizations in GCC with Estimated Edge Profiles from Hardware Event Sampling, reprinted from Proceedings of the GCC developers' Summit, Jun. 17-19, 2008, Ottowa, Ontario CA, pp. 87-102.
Takbayashi, et al., "Binary Hacks: Hackers' 100 Secret Techniques", Japan, O'Reilly Japan Inc., Nov. 8, 2006, First Edition, pp. 81, 83 and 300-302.
Office Action dated Jan. 4, 2019 in Chinese Patent Application No. 2014800198063, and English translation thereof.
Office Action for Brazilian Patent Application No. 1120150243347 dated Mar. 6, 2020. 4 pages.

```
class String
{
public:
    String();

private:
    void resize (size_t s);
```

501 — 
```
#ifndef BUF_SIZE
#define BUF_SIZE 52
#endif
```
```
    char buffer_[BUF_SIZE];
    char *external_buffer_;
```

/* Profiling specific section: */

502 —
```
struct ProfCounter {
    ...
};
```

503 —
```
static void profile_init (void)  __attribute__ ((profile_init));
```
```
static void profile_handler (void);
static void profile_update (void *, gcov_type value);

static ProfCounter *counter_;
};
```

505 —
```
void
String::profile_init (void)
{
  /* Counter creation */
  counter_ = new ProfCounter_ ();

/* Register handler: */
  __gcov_register_profile_handler (&profile_handler);
}
```

507 —
```
void
String::profile_handler (void)
{
  /* Process counter_ data */
  ....
  /* Now record the optimal buffer size */
  __gcov_record_parameter_value ("BUF_SIZE", optimal_buffer_size);
}
```

```
void
String::resize (size_t s)
{
```

509 —
```
    __builtin_invoke (profile_update, counter_, s);
```

```
int bar () {
  ...
  foo (a);
  ...
} int bar () {
  ...
  __builtin_vpi_alloc (__GCOV_TOPN_VAL);            // 702
  __builtin_vpi (__GCOV_TOPN_VAL, a);               // 704
  __builtin_vpt (__GCOV_TOPN_VAL, __GCOV_MULTI_VER, a);  // 706
  foo (a);
}
```

FIG. 7

```
class vector { public:
  inline vector (size_t n);
  inline ~vector();

int operator[](int i) const;
  void push_back(int i);

private:
  int    *buffer_;
  size_t  length_;
};

int foo ()
{
  vector *v = new vector (10); // Site we care about:
  ..
}
```

FIG. 8a

```
class vector {
public:
   ...

private:
```
802 — 
```
#ifdef PROFILE_GENERATE   // Does not affect CFG
   gcov_type *counter_base_ __attribute__((gcov_counter_base));
#endif
};
```

```
vector::vector (size_t n) {
```
804 — `__builtin_vpi_alloc (_GCOV_COUNTER_AVERAGE, this);`

806 — `__builtin_vpt (_GCOV_COUNTER_AVERAGE, GCOV_AVERAGE_VAL, n);`
```
   ...
};
```

```
vector::~vector () {
```
808 — `__builtin_vpi (_GCOV_COUNTER_AVERAGE, length_, this);`
```
   ...
}
```

FIG. 8b

```
class vector { public:
  inline vector (size_t n);
  inline ~vector();

// This version of insert will increase capacity 1 element at a time as needed since the
  // InputIterator length is unknown.
  insert (iterator pos, InputIterator first, InputIterator last);

private:
  int    *buffer_;
  size_t  length_;
  size_t  inserted_length_;
};

int foo ()
{
  vector *v = new vector (10);
  // Fill v and operate on it
  ...
  // Append from file.
  v->insert(pos, It(ifstream("file")), It());
  ...
}
```

FIG. 9a

```
class vector {
public:
    ...

private:

#ifdef PROFILE_GENERATE   // Does not affect CFG
    gcov_type *counter_base_constr_ __attribute__((gcov_counter_base));
    gcov_type *counter_base_insert_ __attribute__((gcov_counter_base));
#endif
};
```
902 ↗ (points to the #ifdef block above)

```
vector::vector (size_t n) {
    __builtin_vpi_alloc (_GCOV_COUNTER_AVERAGE, this, "counter_base_constr_", 1);
    __builtin_vpi_alloc (_GCOV_COUNTER_AVERAGE, this, "counter_base_insert_", 2);
```
904 ↗

```
    __builtin_vpt (_GCOV_COUNTER_AVERAGE, GCOV_AVERAGE_VAL, inserted_length_, 2);
    ...
    __builtin_vpt (_GCOV_COUNTER_AVERAGE, GCOV_AVERAGE_VAL, n, 1);
    ...
};
```
910 ↗

```
vector::~vector () {
    __builtin_vpi (_GCOV_COUNTER_AVERAGE, length_, this, "counter_base_constr_");
    ...
}
```
906 ↗

```
vector::insert (iterator pos, InputIterator first, InputIterator last) {
    reserve (inserted_length_);
    ...
    __builtin_vpi (_GCOV_COUNTER_AVERAGE, length_, this, "counter_base_insert_");
}
```
908 ↗

FIG. 9b

FRAMEWORK FOR USER-DIRECTED PROFILE-DRIVEN OPTIMIZATIONS

CROSS-REFERENCE TO RELATED APPLICATIONS

The present application is a continuation of U.S. patent application Ser. No. 16/524,929, filed Jul. 29, 2019, which is a continuation of U.S. patent application Ser. No. 15/701,296, filed Sep. 11, 2017, and issued as U.S. Pat. No. 10,365,903 on Jul. 30, 2019, which is a continuation of U.S. patent application Ser. No. 13/855,557, filed Apr. 2, 2013, and issued as U.S. Pat. No. 9,760,351 on Sep. 12, 2017, the disclosures of which are incorporated herein by reference.

BACKGROUND

Feedback-directed optimization (FDO) is a technique used to tune application executions based on application runtime behavior in order to improve performance. FDO is also known as Profile Guided Optimization (PGO) and Profile Based Optimization (PBO). In order to tune applications, FDO conducts profiling on the applications. Profiling is the process of gathering information about how an application behaves during runtime. This profile information is used to drive decisions regarding various application optimizations.

As illustrated in FIG. 1, customary feedback-directed optimization is a dual build model technique that uses static instrumentation to collect edge and value profiles. An instrumentation build (101) allows the compiler to insert code into an application's binary to create an instrumented version of the binary (102). This inserted code typically counts edges or collects value profiles. The instrumented binary (102) is run on a representative set of training data (104) in a training run (103). At the end of the training execution, all collected edge counts and value information is written and aggregated in a profile database or gcov data file (GCDA) (105). An optimization build (106) then occurs in which the compiler uses the generated profile to make optimization decisions such as inline decisions, instruction scheduling, basic block re-ordering, function splitting, and register allocation.

One problem with customary FDO is that the technique relies on compilers that do not understand the high-level details of the applications on which FDO runs. For example, compilers do not know application-specific algorithms or parameters. Customary feedback-directed optimization can therefore only handle a very limited set of low level profiles, such as control flow edge profiling or a predefined set of value profiles including indirect function call targets, string function call size, and alignment profiles.

In many cases, software developers have in-depth knowledge of high-level details for their applications. Developers often know which aspects of their code are important and which parameters should be tuned in order to improve application performance. However, in common runtime libraries, these parameters are either left untuned or the parameters are tuned for average applications since customary FDO processes do not allow for user-defined profile optimizations. Although some developers choose to manually tune their code for specific applications, manual processes can be labor-intensive. As recognized by the inventors, there should be a framework that allows easy application performance tuning that can be done automatically during compilation.

SUMMARY

This specification describes technologies relating to application performance improvement in general, and specifically to methods and systems for automatically tuning performance parameters based on application runtime behavior.

In general, one aspect of the subject matter described in this specification can be embodied in a method for using profiling to obtain application-specific, preferred parameter values for an application. The method may include receiving identification of a parameter for which to obtain an application-specific value; receiving augmented code for profiling the parameter; profiling the parameter and collecting profile data; analyzing the profile data; and determining the application's preferred parameter value for the profiled parameter based on the analyzed profile data. A second aspect of the subject matter can be embodied in a method for user-directed per-class global value profiling which may include: receiving a user-defined profile instrumentation initialization routine; within the profile initialization routine, initializing a counter and registering a user-defined analysis call back routine; running a profile update function in a code location where the counter's value should be updated; and executing a profile handler method to process counter data and record the counter value. A third aspect of the subject matter described in this specification can be embodied in a method of user-directed per-site value profiling or user-directed per-site object value profiling which may include: allocating space in a compiler's static counter array for a counter; running a user-directed value profile instrumentation support interface to execute instructions on which counter type to user and the value to be profiled; and running a user-directed value profile transformation support interface to perform a specific value profile transformation on the parameter during an optimization build.

These and other embodiments can optionally include one or more of the following features: profiling may be user-directed per-class global value profiling; profiling may be user-directed per-site value profiling; profiling may be user-directed per-site object value profiling; profiling the parameter and collecting profile data may include generating an instrumentation binary from an instrumentation build, executing a training run with one or more representative workloads using the instrumentation binary to generate profile data, and storing the generated profile data; determining the application's preferred parameter value may include using a specified callback method to do custom processing of the profile data to select the preferred value of the parameter and recording the preferred value; the recorded preferred value may be used in an optimization build to initialize the parameter; determining the application's preferred parameter may include running an optimization build that consumes the profile data and using a set of standard value profile transformations, transforming a parameter value to a preferred value based on the profile data; a profile counter may be defined for a parameter to be profiled; one entry in a static counter array may be allocated for a counter; counter allocation may be done by calling a compiler extension for counter allocation; a user-directed value profile instrumentation support interface may be a GCC builtin language extension; a user-directed value profile transformation support interface may be a GCC builtin language extension; a profile counter address may be tracked by providing a special purpose declaration attribute for the profile counter; profile initialization may be provided by a special purpose declaration attribute to designate a profile initialization function; a user-defined analysis call back routine may be defined by using a GCC interface; and a parameter may be recorded by using a GCC interface.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 5 is example code illustrating an embodiment of user-directed per-class global value profiling.

FIG. 7 is example code illustrating an embodiment of user-directed per-site value profiling.

FIG. 8a is customary code depicting a vector class that pre-allocates a vector size.

FIG. 8b is example code illustrating an embodiment of user-directed per-site object value profiling.

FIG. 9a is customary code depicting a vector class that pre-allocates a vector size and an element size.

FIG. 9b is example code illustrating an embodiment of user-directed per-site object value profiling.

DETAILED DESCRIPTION

Figure 1:
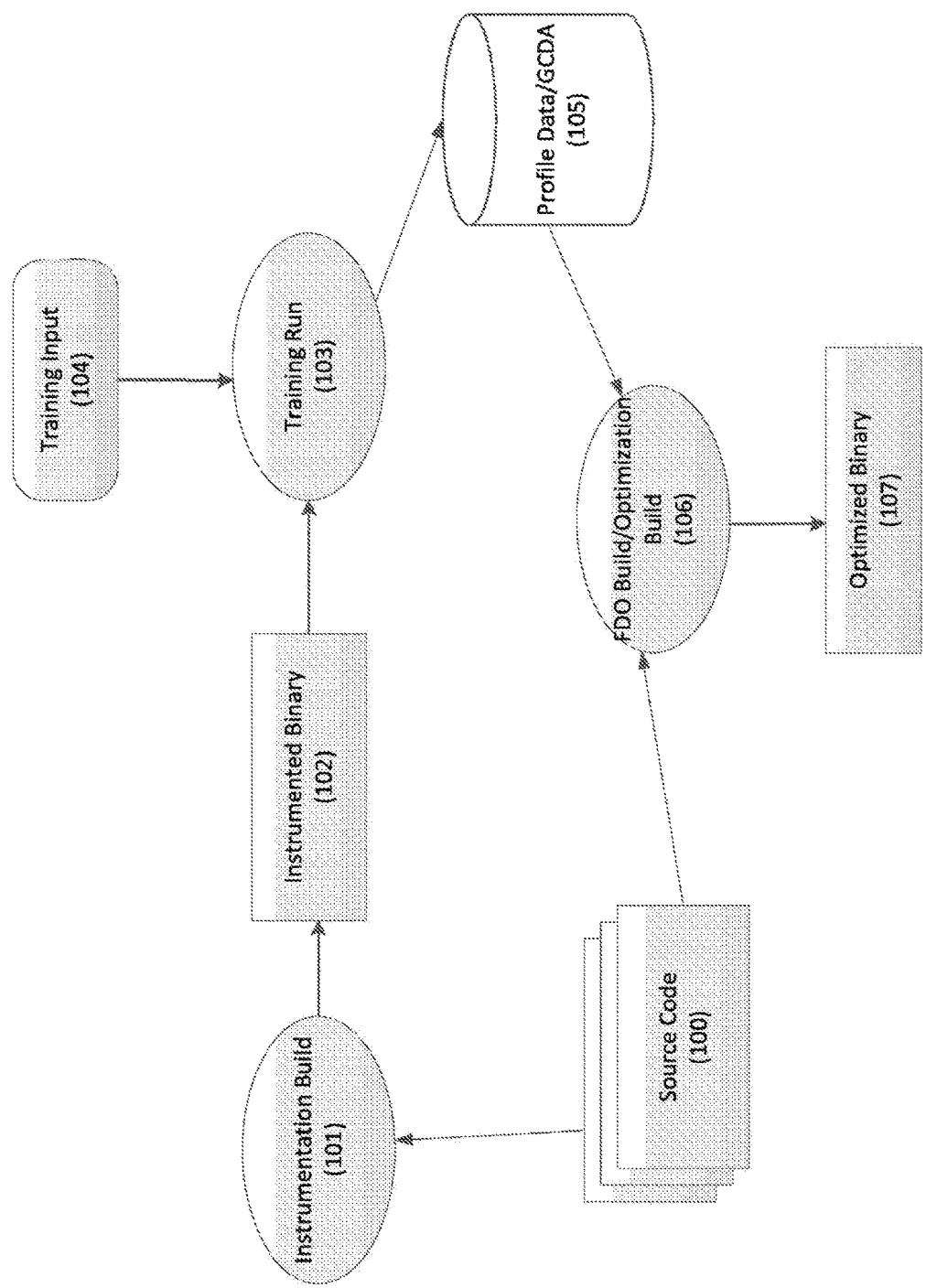
FIG. 1 is a block diagram illustrating a conventional feedback-directed optimization loop.
Figure 2:
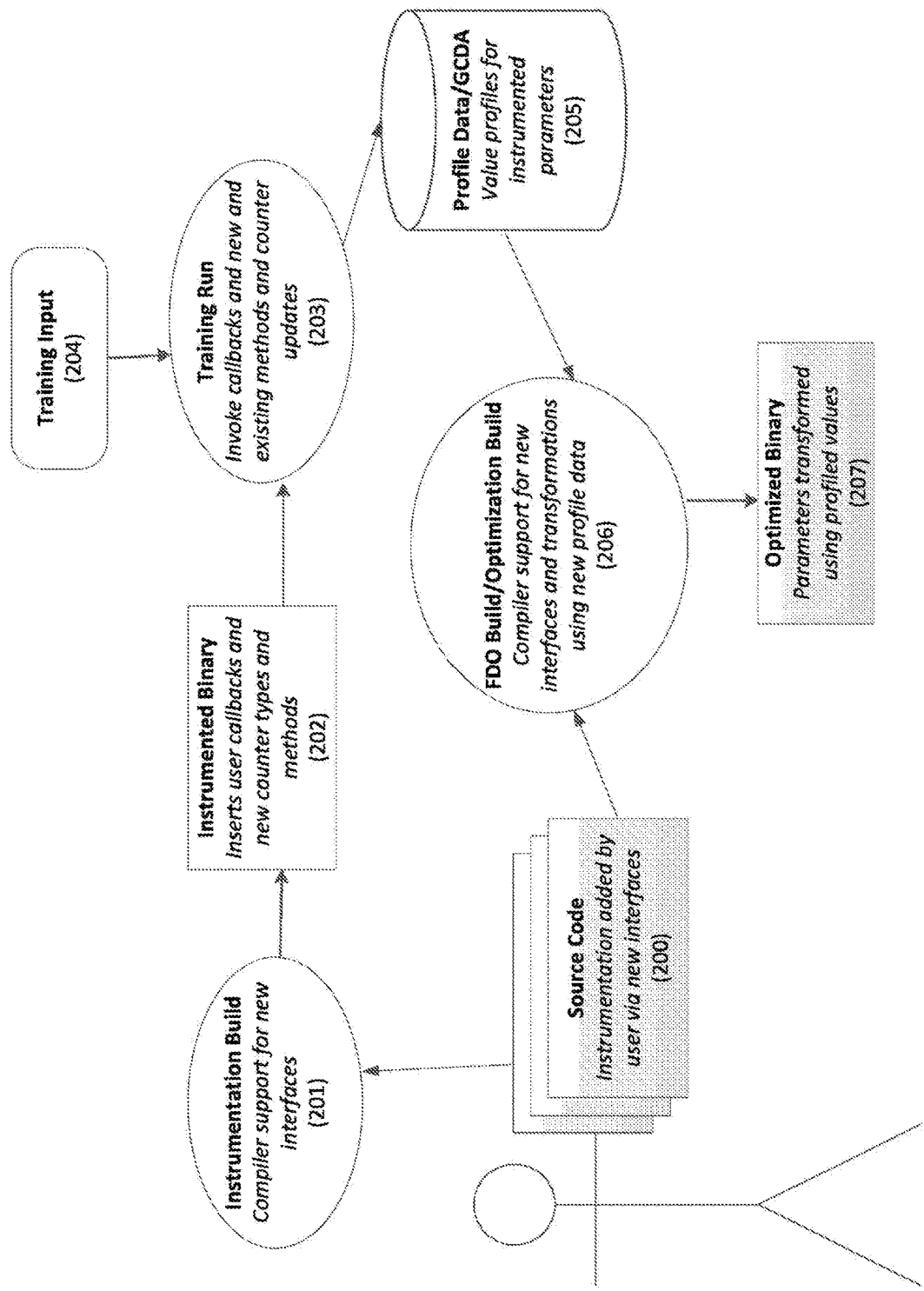
FIG. 2 is a block diagram illustrating an example user-driven feedback-directed optimization loop.

According to an example embodiment, a framework can facilitate user-directed profile-driven optimizations by allowing a software developer to profile selected parts of an application and direct a compiler to perform value profile transformations based on the profiling results as shown in FIG. 2. User-defined information may be included in both the instrumentation and the optimization compilations of a feedback loop.

Figure 3:
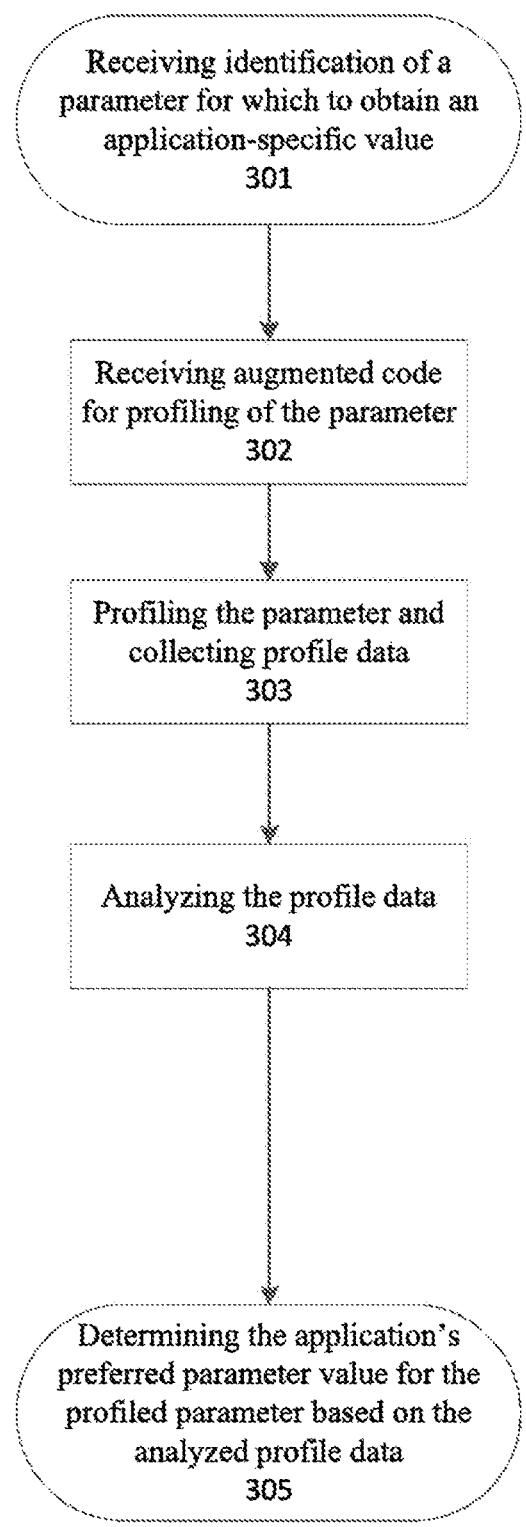
FIG. 3 is a flow diagram of an example method for obtaining application-specific, profile-driven optimizations for an application.

An example method for obtaining application-specific, preferred parameter values for an application using profiling begins with identifying a parameter for which to obtain an application-specific value (301) as shown in FIG. 3. Code should then be augmented for application-specific profiling of the parameter (302). In some embodiments, the code to be augmented may be the application code. In other embodiments, the code to be augmented may be a library which is used by the application code. The parameter is then profiled specifically for the application (303). Profiling may include two steps: (a) an instrumentation build and (b) a training run.

The instrumentation build may invoke the compiler to generate a binary containing the necessary instrumentation code to profile the parameter or parameters when the binary is run. This step may use user-specified annotations to insert special instrumentation for profiling annotated parameters.

The training run uses the binary produced in the instrumentation build and executes the binary with one or more representative workloads. This training run produces profile data, which is collected and stored in a database or a data file.

After the profile data is collected, the profile data can be analyzed to determine the application's preferred parameter value for the profiled parameter (304, 305).

In some cases, the user may specify a callback method to do custom processing of the profile data to select the preferred value of the parameter. This value is then recorded in the profile database or data file and used in an optimization build to initialize the parameter. This process allows for more complex special-case handling of the profile data in order to select the best parameter value. In this case, the optimization build may blindly apply the parameter value selected at the end of the training run via the user's callback.

In other cases, the optimization build may consume the profile data directly and, using a set of standard value profile transformations that may be provided in compiler support libraries, such as gcov, transform the code or initialize a parameter value based on the profile data.

An example framework may include support for user-directed profile counter allocation, user-directed value profile instrumentation, user-directed value profile transformations, profiler counter address tracking, user-directed profile initializations, runtime integration of user-defined profile analysis callback routines, and recording of user-defined transformation decisions.

As illustrated in FIG. 2, this functionality may work together to enhance feedback-directed optimization. Source code may be instrumented by a user to profile a specific parameter or parameters via new interfaces (200). The source code may then be compiled in an instrumentation build using compiler support for the new interfaces (201). An instrumented binary may contain user callbacks and new counter types and methods (202) which may then be invoked in a training run (203). A profile database or data file may collect value profiles for the instrumented parameters (205). As discussed above, a user callback method may be invoked after profiling. If a user callback method is invoked, the preferred parameter value is recorded in the profile database or data file and used in the optimization build (206) to create the optimized binary (207). In other cases, the optimization build (206) may analyze the profile data directly to transform the profiled parameter or parameters to create the optimized binary (207).

There may be several ways to implement this functionality in an example framework. In one embodiment, user-directed profile counter allocation, user-directed value profile instrumentation, and user-directed value profile transformations may be language extensions of the GNU Compiler Collection (GCC) built-in functions. Profile counter address tracking and user directed profile initializations may be implemented using special purpose declaration attributes. Runtime integration of user-defined profile analysis callback routines and recording user-defined transformation decisions may be implemented using example GCC application programming interfaces. Methods and interfaces for the framework may use standard objects from GCOV which is a test coverage library built for GCC. More details regarding each piece of the example framework functionality is provided in the following paragraphs.

User-Directed Profile Counter Allocation

A user-directed profile counter allocation interface may be used to instruct a compiler to allocate one entry in the static counter array for the specified counter during instrumentation. An example user-directed profile counter allocation method takes in four parameters: (1) the type of counter that should be allocated, (2) a pointer to the object being profiled, (3) an optional parameter that is the name of the counter's base address pointer field, and (4) an optional parameter that is a sequence id. The optional parameter representing the name of the counter's base address pointer field may be used when there are multiple values profiled at the same site. This parameter is discussed in more detail below. The optional sequence id parameter may be used when multiple values with the same type are profiled at the same site.

An example profile counter may be allocated using the following new GCC builtin language extension based on aspects of the inventive concepts:

"__builtin_vpi_alloc(GCOV_COUNTER_TYPE gt, void *this,
    const char *fname=0, gcov_unsigned seq_id=0);"

In this generic declaration "gt" represents the type of counter. The parameter, "this," is an optional parameter representing a pointer to the object being profiled, "fname" is the optional parameter representing the name of the base address pointer field, and "seq_id" is the optional sequence id used when multiple values with the same type are profiled at the same site.

Profile counter allocation may cause a counter to be allocated in an array that may be referred to as "counter_array[site_index]." GCC will allocate counter arrays to hold the counter values of everything being profiled. GCC builtin language extensions may case the compiler to allocate space in the appropriate array for the counters required by the specified builtin. For example, the compiler may initialize the base address field as follows:

"counter_base=&counter_array[site_index];"

In this generic assignment, the counter base receives the address of the index that the counter was assigned in the compiler's counter array. "Site_index" refers to the index allocated for this counter.

User-Directed Value Profile Instrumentation

User-directed value profile instructs the compiler to inject code to profile specified values during profile training runs. An example user-directed value profile interface may take four parameters: (1) a counter type, (2) a parameter, or value, to be profiled, (3) an optional pointer to the object being profiled, and (4) an optional parameter representing the name of the counter's base address pointer field may be used when there are multiple values profiled at the same site. For example, an instrumentation interface may be instantiated using the following new GCC builtin language extension based on aspects of the inventive concepts:

"void_builtin_vpi(GCOV_COUNTER_TYPE gt,
    gcov_type v, void *this=NULL, const char *fname=0);"

In this generic declaration "gt" represents the type of counter and "v" is the parameter, or the value, to profile. The parameter, "this," is an optional parameter for the pointer to the object being profiled and "frame" is the optional name of the base address pointer field.

User-Directed Value Profile Transformation

User-directed value profile transformation instructs a compiler to perform a transformation on the profiled parameter, or value, based on the profile data for the parameter. An example user-directed value profile transformation interface may take four parameters: (1) a counter type, (2) the transformation to be performed, (3) the parameter or value on which to perform the transformation, and (4) an optional sequence id. For example, a transformation interface may be instantiated using the following new GCC builtin language extension based on aspects of the inventive concepts:

"__builtin_vpt(GCOV_COUNTER_TYPE gt,
    GCOV_VPT_TYPE vptt, gcov_type a, gcov_unsigned seq_id=0);"

This interface may be used to instruct the compiler to perform a value profile transformation vptt using value "a" from the counter with type GT.

In this generic declaration, "gt" represents the type of counter to be used and "vptt" is the type of transformation to perform. The parameter, "a," is the parameter, or the value, to transform and "seq_id" is an optional parameter for a sequence id.

Profile Counter Address Tracking

A compiler annotation can be used to specify a new base address field. This attribute should be applied on a non-static field declaration. For example, a base address field attribute may be specified by using a special purpose declaration attribute such as the following:

"__attribute_((gcov_counter_base));"

A counter declaration may be as follows:

"gcov_type    *counter_base__attribute_((gcov_counter_base));"

Attaching the counter base attribute to a counter declaration allows the compiler to generate code to initialize the corresponding base address field for the counter right after the counter is allocated. For example, the compiler may initialize the base address field using the following assignment that was described above:

"counter_base_=&counter_array[site_index];"

User-Directed Profile Initializations

In some instances, a software developer may not want to use the predefined counters and update sequences provided by a compiler and compiler runtime. A software developer can initialize a profile instrumentation routine by implementing a profile initialization function. This function may be treated as a static initialization routine invoked by an .init function in the instrumentation build. In the optimization build, the function will be parsed and discarded. In an example embodiment, a profile initialization function may be specified by using a special purpose declaration attribute such as the following:

"__attribute_((profile_init))"

An example profile initialization routine may be declared as follows:

"static void profile_init(void)_attribute_((profile_init);"

Attaching the profile initialization attribute to a function declaration allows the compiler to understand that the declared function defines profile initialization. When this attribute is applied on a function declaration, the function is treated as a static routine invoked by an .init function in an instrumentation build (201) compilation. In an optimization build (206), the function will be parsed and discarded.

User-Directed Profile Updates

When a software developer does not use the predefined counters and update sequences provided by a compiler and compiler runtime, the developer may need to update the value of a parameter as the parameter is profiled in the training run. A software developer can invoke an update function in the appropriate location in the code where the value of the parameter changes. An invoke function may take three parameters: (1) a pointer to an update function, (2) a pointer to the user-defined counter variable, and (3) the parameter, or value, to be profiled. An example method may be defined as follows:

"void_builtin_invoke(void(*updater)(void *), void *profile_counter, gcov_type data);"

In this generic declaration, "updater" points to the user-defined update function named "updater," "profile_counter" is a pointer to the user-defined counter variable, and data is the value, or parameter, to be profiled. In the instrumentation build, this builtin may be expanded into a call:

"updater(profile_counter, data)"

In an optimization build, the builtin may do nothing.

Runtime Integration of User-Defined Profile Analysis Callback Routines

If a software developer is not using predefined counters and update sequences to profile and update parameter values, the developer needs a way to process collected profile data and record the preferred parameter value for each profiled parameter. The software developer may define a callback routine to process the collected profile data and record the preferred parameter value to use during an optimization build. The callback routine should be registered by the user in the profile initialization function discussed above. To register the callback routine, the developer may instantiate a register interface that takes a pointer to the callback routine as a parameter. This instantiation should be called by the profile initialization function discussed above. In some embodiments, the callback routine registration may be defined as follows:

"void_gcov_register_profile_handler(void (*handler) (void));"

In this generic registration function declaration "*handler" represents a pointer to the user-defined callback routine or profile handler function.

Recording of User-Defined Transformation Decisions

As noted above, if a software developer is not using predefined counters and update sequences to profile and update parameter values, the developer needs a way to process collected profile data and record the preferred parameter value for each profiled parameter. Recording values may be done with an interface that takes two parameters: (1) a macro name and (2) the preferred value. For example, a recording interface may be instantiated using the following API:

"void_gcov_record_parameter_value(const char *macro_name, gcov_type optimal_value);"

In this generic declaration "macro name" represents the name of the source macro to be updated with the profile optimized value "optimal_value" in the feedback-directed optimization build (206). The parameter, "optimal_value," is the preferred value to which the designated macro should be set. This interface records the mapping between "macro_name" and the "optimal_value" for use in the optimization build.

Using the Framework

Pieces of an example framework can be used together to allow a software developer to define and use several different classes of value profiling including: user-directed per-class global value profiling, user-directed per-site value profiling, and user-directed per-site object value profiling.

User-Directed Per-Class Global Value Profiling

User-directed per-class global value profiling is used to profile and optimize specific parameter values for an application. This type of profiling may be especially beneficial when an application uses a library that is shared by multiple programs, which have no connection to each other. A library is a collection of code that is commonly shared by different programs which defines certain behavior through a well-defined interface. A typical library usually has many parameters by which to control runtime performance. However, most libraries usually either do not tune these parameters or tune the parameters for some applications which use the library, but not all. Maintaining a different set of parameters for each application which uses the library is not practical because the parameter values may become obsolete over time.

This type of profiling may require that a software developer keep track of parameter counters independent of the compiler. A compiler may not understand the critical values of an application which should be tracked or how to track the values. Therefore, a user must keep track of the parameter counters.

In order to use user-directed per-class global value profiling to obtain application-specific parameter values for a particular application, a software developer may use several pieces of the example framework including a user-directed profile initialization function, a registered user-defined callback routine, a user-defined update function, and a method for recording user-defined transformation decisions. Using framework pieces, a software developer can embed the decision process for choosing preferred parameters into the compiler-based feedback-directed optimization loop.

Figure 4:
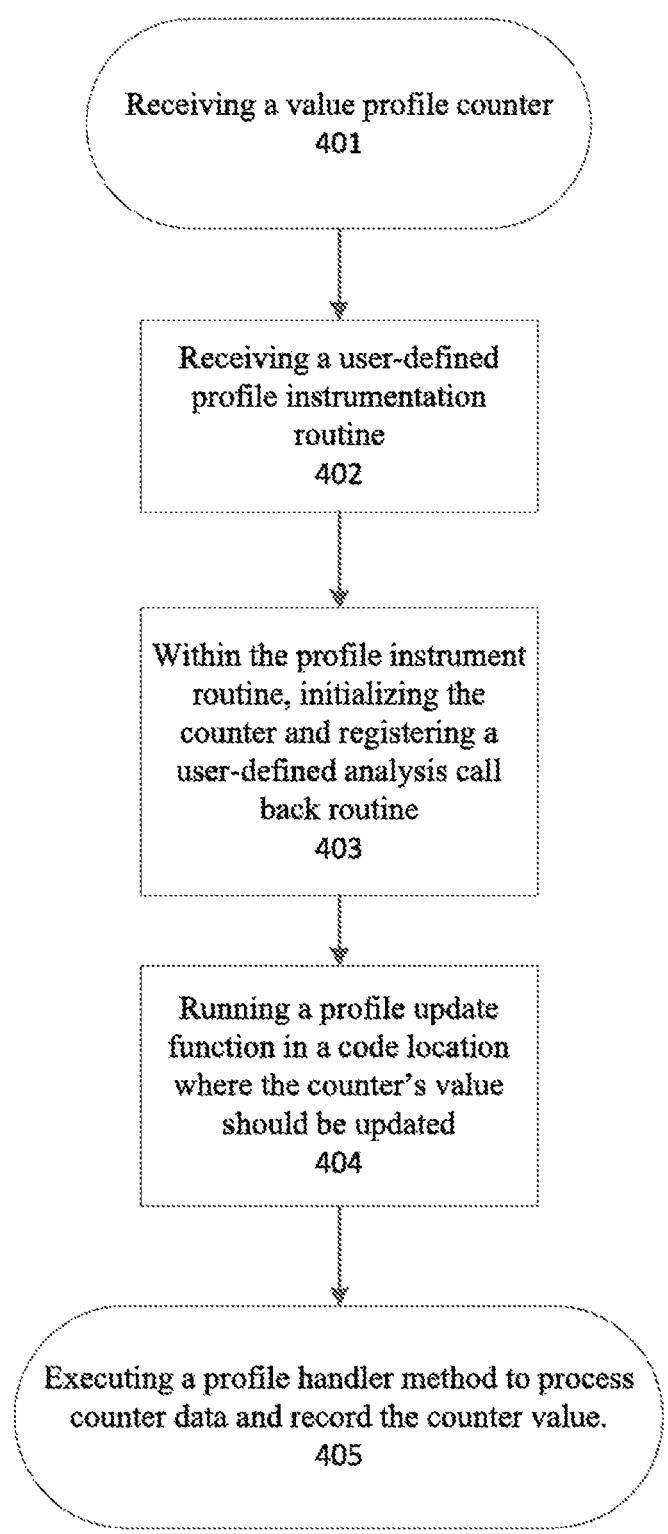
FIG. 4 is a flow diagram of an example method for user-directed per-class global value profiling.

An example method for user-directed per-class global value profiling begins with a user specifying value profile counter types and defining value profile instrumentation routines instead of depending on customary predefined counters and update sequences as shown in FIG. 4 (401, 402).

To profile a parameter, a software developer may first construct a counter. Then, a user may create a profile initialization routine function. This function may be designated by including a profile initialization attribute to the declaration of the function as discussed above. When a profile initialization attribute is applied on a function declaration, the function may be treated as a static initialization routine invoked by an .init function in instrumentation compilation. In optimization compilation, the function may be parsed and discarded. Within the profile initialization function, the developer may initialize the counter to profile a particular parameter.

In order to update the parameter's value as it changes during an instrumentation build, a software developer provides a profile update function in a location where the counter's value should be updated (404). A software developer may use a language extension to GCC's builtin or some other code to invoke a user-defined profile update function in the designated location. As discussed above, an invoke function may expand to an update function. This update function records the values of the profiled parameter during the instrumentation build.

A profile handler function may also written by the software developer to process the counter profile data and record the determined preferred parameter value for the profiled parameter during the optimization build. The profile handler function may be registered in a callback routine in the profile initialization function (403). The software developer may also instantiate a record method as discussed above for recording user-defined transformation decisions (405).

For example, as depicted in FIG. 5, a software developer may want to determine the preferred size for a buffer in library code for a specific application. The buffer size parameter value is at first defined in a macro to be 32 (501).

In order to determine and set a buffer's preferred size for a specific application, a software developer may use aspects of an example framework to augment the code and profile the buffer.

As shown in FIG. 5, a software developer constructs a counter, ProfCounter (502). Then, a user-defined profile instrumentation routine function may be designated by including a profile initialization attribute to the definition of the function. In FIG. 5, "profile_init" is designated as the profile instrumentation routine function by using "_attribute_((profile_init))" (503). The software developer then initializes the counter within the profile initialization function.

The software developer may then define an update method to update the profiled parameter's value when the parameter's value changes during an instrumentation build. As shown in the buffer example of FIG. 5, a software developer invokes the profile update function within a resize method which resizes the buffer (509). In this invocation, "profile_update" is the user-defined update function, "counter_" is the user-defined counter variable, and "s" is the data value to be profiled. In an instrumentation build, this invocation may expand into a call:"profile_update(counter_,s)"

A software developer can then define a profile handler function that processes profiled data from the instrumentation build and determines a preferred size for the buffer (507). This profile handler function records the preferred buffer size in a profiling database and uses a mechanism to pass the macro to a parser to be used during optimization compilation. The compiler may read in the gcov data file (GCDA) early in the optimization build process. This read-in process code may be enhanced to understand the new macro parameter types and communicate the macro parameters to the part of the compiler that parses the source code. In this case, the macro "BUF_SIZE" receives the preferred parameter value "optimal_buffer_size" when the profile handler function is run during the optimization build. The "optimal_buffer_size" is determined by processing all the recorded buffer sizes. For example, processing may include averaging the recorded buffer sizes and determining the preferred buffer size may be the computed average.

The profile handler can then be registered as the callback routine to be run during the optimization build (505). In this example, the software developer passes the address of the profile handler function, "profile_handler" to the registration method.

User-Directed Per-Site Value Profiling

User-directed per-site value profiling may be used for example to determine preferred parameters for function call parameters, expensive operation's operands, or loop bounds. For per-site value profiling, the instrumentation site and the transformation site are in the same location which means that there is no need for analysis callbacks.

Figure 6:
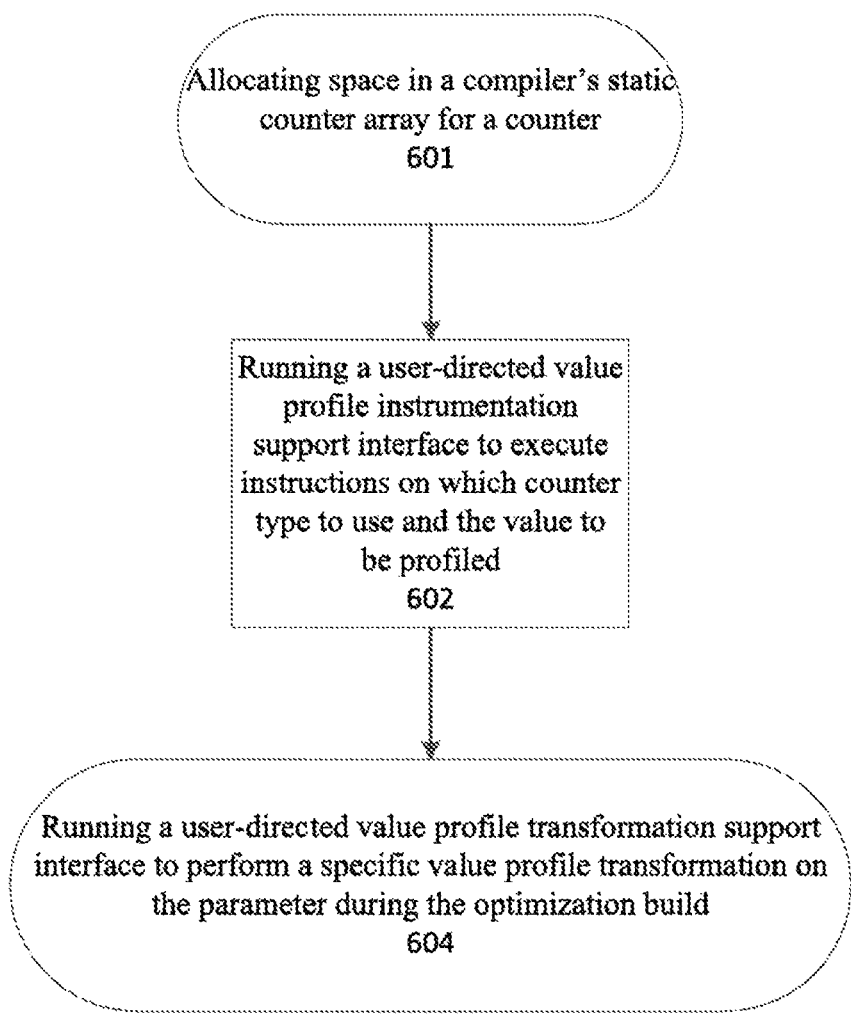
FIG. 6 is a flow diagram of an example method for user-directed per-site value profiling or user-directed per-site object value profiling.

In order to support user-directed per-site value profiling, a software developer may use several pieces of the example framework including: user-directed profile counter allocation, user-directed value profile instrumentation, and user-directed value profiling transformation. As illustrated in FIG. 6, an example profile counter allocation interface may be used to instruct a compiler to allocate one entry in the static counter array for the specified counter during instrumentation (601).

An example user-directed value profile instrumentation support interface may be used to instruct the code on the counter type to use and the value to profile when value profiling parameters during an instrumentation build (602).

An example framework may also provide a user-directed value profile transformation support interface that may be used in optimization builds (604). This interface may be used to instruct a compiler to perform a value profile transformation on a certain parameter using the value from the counter with the specified counter type.

FIG. 7. Illustrates an example of value profiling and multi-version transformation for the first parameter of the call to a function, "foo." Code is first augmented for profiling the parameter. A method is inserted for profile counter allocation. The profile counter allocation in this example is an allocation for a counter that finds the most frequent N values, "_GCOV_TOPN_VAL" (702). The user-directed value profile instrumentation support interface specifies that the compiler should instrument the code to find the most frequent "a" values using the _GCOV_TOPN_VAL counter (704). The user-directed value profile transformation support interface specifies that the compiler should perform a multi-versioning transformation, "_GCOV_MULTI_VER," using value "a" from the "_GCOV_TOPN_VAL" counter (706).

User-Directed Per-Site Object Value Profiling

User-directed per-site object value profiling may be used to perform value profiling and transformation for objects instantiated at the same static site. In order to support user-directed per-site value profiling, a software developer may use several pieces of the example framework including: user-directed profile counter allocation, user-directed value profile instrumentation, profile counter address tracking, and user-directed value profiling transformation.

An example method for this type of profiling begins with augmenting code for an instrumentation build. Compiler annotation may be used to specify a new base address field in order to track the address of a profile counter. This attribute should be applied on a non-static field declaration. For example, a base address field attribute may be specified by using a special purpose declaration attribute such as the following:

"_attribute_((gcov_counter_base));"

Code may also be inserted for profile counter allocation. Then, instrumentation code may be inserted to profile the desired parameter or value. Finally, code may be inserted to do profile transformation.

For example, FIG. 8a depicts a vector class that pre-allocates a vector size. The new vector is created with a size of 10. However, 10 may not be the preferred size of the vector. In order to determine the amount of space to reserve for the vector in the function "foo" and allocate the object appropriately, a software developer may use user-directed per-site object value profiling, FIG. 8b illustrates the process for conducting user-directed per-site object value profiling in order to determine the preferred length of a vector. First, the class should be augmented in order to profile the length parameter.

In this example, a macro is created for the instrumentation build, "PROFILE_GENERATE" (802). A compiler annotation is used to specify a new base address field as shown in FIG. 8b on counter, "counter_base_" (802).

Code is then inserted for profile counter allocation. The profile counter allocation in this example is an allocation for a counter that keeps a running sum and count of the profiled value using the standard "_GCOV_COUNTER_AVERAGE" counter (804). In this example, the allocation uses "this" which is a pointer to the vector object being profiled.

The next step is to insert instrumentation code to record the final length of the vector. The final length of the vector can be determined in the vector destructor since, at this destruction point, the code knows the final length that was required for the vector. As illustrated in FIG. 8b, the user-defined value profile instrumentation support interface specifies that the compiler should instrument the code to keep a running sum and a count of the length using a standard counter of type _GCOV_COUNTER_AVERAGE (808).

After inserting instrumentation code to value profile the vector's final length, code should be inserted to perform a transformation on the vector's length parameter in order to determine the preferred length of the vector. Transformation occurs during the optimization build using the profiling data received from the instrumentation build. As illustrated in FIG. 8b, the user-directed value profile transformation support interface specifies that the compiler should perform an averaging over the lengths using GCOV's standard average transformation, "_GCOV_AVERAGE_VAL," and the received values of "n" from the standard counter "_GCOV_COUNTER_AVERAGE" during the training run (806).

This average value is then sent to the profile database, or gcda file, and used as the preferred length parameter for the vector instances created at the instrumentation site. Every time the compiler generates the code for a new vector, a builtin may tell the compiler to set the size of the vector to be the average value from the profile data. This type of profiling and optimization is leveraging the fact that the profile transformation sites, or places in the code to perform transformations, are inlined in many locations. As a result, there may be a context-sensitive, inline-site-specific, profile collected and transformation generated at each inline site. In this case, vectors instantiated in different places throughout the application code can get different profile-based length values rather than the library default.

An additional example of user-directed per-site object value profiling is illustrated in FIGS. 9a and 9b. This example is a follow-on to the example discussed above in relation to FIGS. 8a and 8b. In addition to determining the vector's length, the amount of space to pre-allocate at the start of an insertion operation can be determined. Normally, an insertion operation increases the length of a vector one element at a time, but this increase amount may not be sufficient. FIG. 9a illustrates customary vector code.

FIG. 9b illustrates the augmented code that allows the automatic process for conducting user-directed per-site object value profiling in order to determine the preferred length of a vector and the amount of space that should be pre-allocated at the start of an insertion operation.

In this example, a macro is created for the instrumentation build, "PROFILE_GENERATE." Two counters are defined, one for vector length and one for insertion size. Each counter is defined with a compiler annotation that is used to specify new base address field. FIG. 9b shows the compiler annotation "_attribute_((gcov_counter_base))" on "counter_base_constr_" and "counter_base_insert_" (902).

Code is then inserted for profile counter allocation. The counter for vector length is instantiated and then the counter for insert size is instantiated. Both counters are of the standard gcov counter type for keeping a running sum and a count, "_GCOV_COUNTER_AVERAGE" (904). In this example, both allocations use pointers to "this" which is the vector object that is being profiled. The optional parameter "fname" is used to distinguish the names of the base address pointer fields defined in the macro, "counter_base_constr_" and "counter_base_insert_." The field name is used to initialize the appropriate counter, but is a string to avoid parsing errors when not in the instrumentation build. This optional parameter is necessary when there are multiple values profiled at the same site. The additional optional parameter "seq_id" is used when there are multiple values with the same type being profiled at the same site as is the case in this example. In this case, the sequence ids are set to 1 and 2 respectively.

The next step is to insert user-directed value profile instrumentation code to value profile the final length of the vector. The final length of the vector can be determined in the vector destructor since, at this destruction point, the code knows the final length that was required for the vector (906). As illustrated in FIG. 9b, the instrumentation support interface specifies that the compiler should instrument the code to record the current vector length.

Instrumentation code should also be inserted to value profile the inserted length of elements in the vector (908). The inserted length can be determined in the vector's insert function. As illustrated in FIG. 9b, the instrumentation support interface specifies that the compiler should instrument the code to record the insert length. The field name is used in both of these uses of the user-directed value profile instrumentation support interface to generate appropriate updates to the appropriate counters. The field names are strings to avoid parsing errors when the instrumentation build is not being run.

After inserting user-directed value profile instrumentation code to value profile the vector's final length and the inserted length of elements in the vector, code should be inserted to do value profile transformations (910). As illustrated in FIG. 9b, one user-directed value transformation support interface specifies that the compiler should perform an averaging over the lengths using the standard gcov transformation for averaging, "_GCOV_AVERAGE_VAL," and values of "n" from the "_GCOV_COUNTER_AVERAGE" counter type with a sequence_id of 1. A second transformation support interface specifies that the compiler should perform an averaging over the inserted lengths using the inserted length values from the "_GCOV_COUNTER_AVERAGE" counter type with a sequence_id of 2. The sequence_id tags are used to associate the transformation site with the correct allocation site so that the appropriate counter value from the profile database, or GCDA file is used in the correct optimization decision.

These average values are then sent to the profile database, or the gcda file, and used as the preferred length parameter for vector and the preferred pre-allocation size for inserting elements. This type of profiling and optimization is leveraging the fact that the profile transformation sites, or places in the code to perform transformations, are inlined in many locations. As a result, there may be a context-sensitive, inline-site-specific, profile collected and transformation generated at each inline site. In this case, vectors instantiated in different places throughout the application code can get different profile-based length values rather than the library default. Additionally, pre-allocation size may be determined on a per-site basis.

Other examples of aspects of the inventive concepts include value profiling expensive operations such as divisions or multiplications and value profiling loop iteration bounds.

An example framework can be used to tune libraries such as STL and memory allocators, on a per-application basis based on application-specific profile information. This performance tuning may translate into very large performance improvements and machine savings. The framework seamlessly integrates with the FDO framework which makes application tuning automatic and removes the possibility of stale parameters. Furthermore, an example framework can be used to tune code behavior for non-performance related purposes, such as memory consumption and memory fragmentation.

Figure 10:
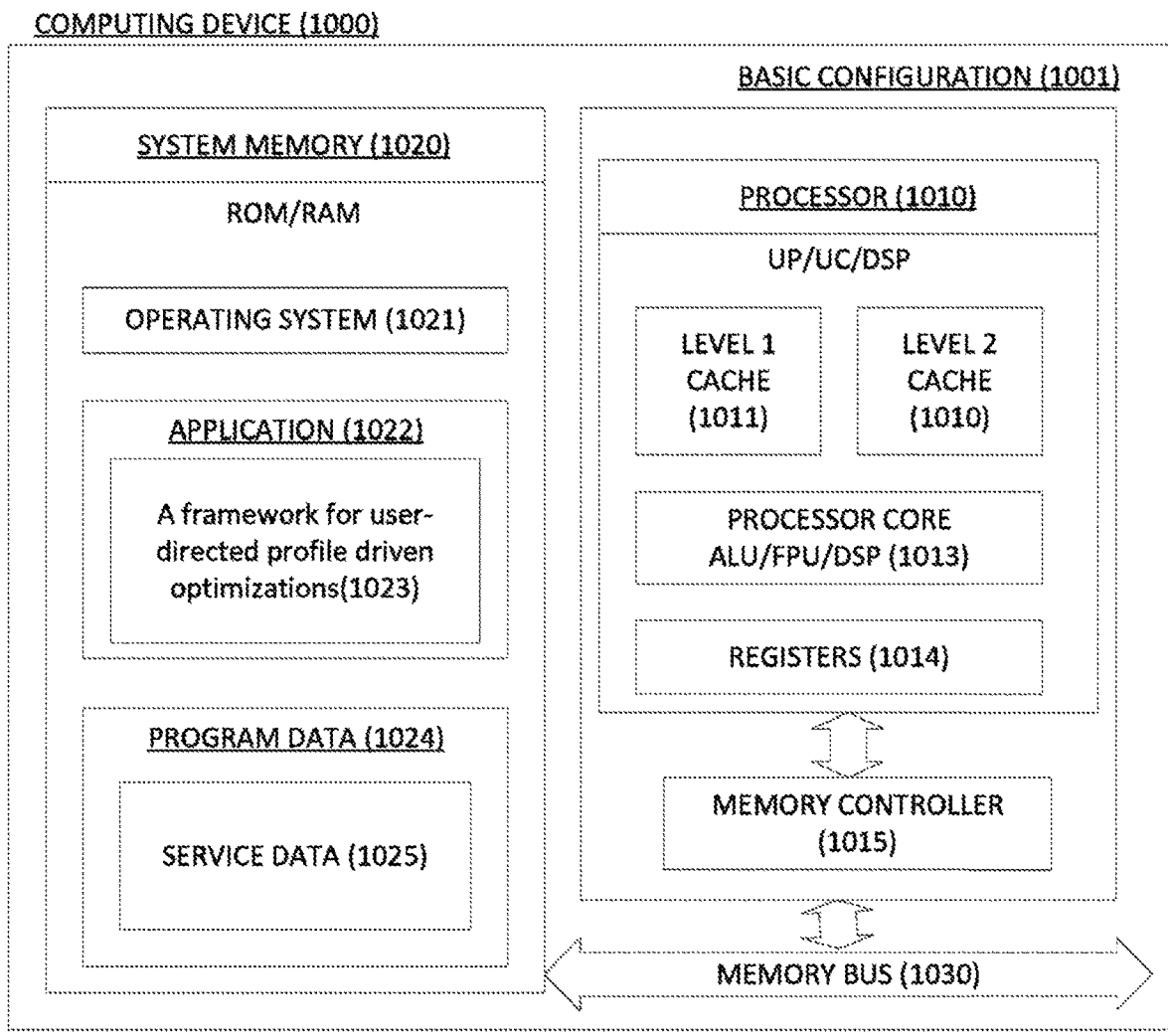
FIG. 10 is a block diagram illustrating an example computing device.

FIG. 10 is a high-level block diagram of an example computer (1000) that is arranged for creating user-directed profile-driven optimizations. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (μP), a microcontroller (μC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include a method for creating and obtaining application-specific, profile-driven optimizations for the application. Program Data (1024) includes storing instructions that, when executed by the one or more processing devices, implement a method for code optimizations. (1023). In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for using profiling to determine application-specific values for an application, the method comprising:
   profiling, by a computer, one or more application-specific parameters for which to determine at least one application-specific value and collecting profile data by performing operations of:
   generating, by the computer, an instrumentation binary from an instrumentation build;
   executing, by the computer, a training run with one or more representative workloads using the instrumentation binary;
   analyzing, by the computer, the collected profile data using a set of standard value profile transformations, wherein the set of standard value profile transformations are provided in one or more compiler support libraries, and wherein the set of standard value profile transformations are specified in user-directed value transformation support interfaces; and
   generating, by the computer using the collected profile data, an optimized binary utilizing the at least one application-specific value for the profiled application-specific parameter recorded in the collected profile data.

2. The method of claim 1, wherein the instrumentation binary contains at least one user-defined callback routine registered by the user in a profile initialization function.

3. The method of claim 2, wherein the profile initialization function is specified using a special purpose declaration attribute.

4. The method of claim 1, wherein the profiling is per-class global value profiling.

5. The method of claim 1, wherein the profiling is per-site value profiling.

6. The method of claim 1, wherein the profiling is per-site object value profiling.

7. A method for per-class global parameter value profiling, the method comprising:
- initializing, by a computer, within a user-defined profile instrumentation initialization routine, a counter to profile one or more parameter values;
- generating, by the computer, an instrumentation binary from an instrumentation build;
- executing, by the computer, a training run with one or more representative workloads using the instrumentation binary, the execution of the training run performing operations of:
- running, by the computer, a profile update function, which uses a set of standard value profile transformations, for updating the profiled parameter value in a code location where the counter's value should be updated, wherein the set of standard value profile transformations are provided in one or more compiler support libraries, and wherein the set of standard value profile transformations are specified in user-directed value transformation support interfaces; and
- generating, by the computer using profile data collected during execution of the training run, an optimized binary.

8. The method of claim 7, wherein the counter is allocated to one entry in a static counter array.

9. The method of claim 8, wherein the counter is allocated in the static counter array by using a compiler extension.

10. The method of claim 7, wherein profile counter address is specified by using a special purpose declaration attribute.

11. The method of claim 7, wherein the instrumentation build contains at least one user-defined callback routine registered by the user in a profile initialization function.

12. The method of claim 11, wherein the profile initialization function is specified using a special purpose declaration attribute.

13. The method of claim 7, wherein the profile handler function is registered using a GNU compiler collection (GCC) interface.

14. The method of claim 7, further comprising running, by the computer, a defined analysis callback routine to record a preferred parameter value of the profiled parameter values.

15. The method of claim 14, wherein the preferred parameter value of the profiled parameter values is recorded using a GNU compiler collection (GCC) interface.

16. A non-transitory computer-readable medium storing instructions, that when executed by one or more processors, cause the one or more processors to:
- profile one or more application-specific parameters for which to determine at least one application-specific value and collecting profile data by performing operations of:
- generate an instrumentation binary from an instrumentation build;
- execute a training run with one or more representative workloads using the instrumentation binary;
- analyze the collected profile data using a set of standard value profile transformations, wherein the set of standard value profile transformations are provided in one or more compiler support libraries, and wherein the set of standard value profile transformations specified in user-directed value transformation support interfaces; and
- generate an optimized binary using the collected profile data.

17. The non-transitory computer-readable medium of claim 16, wherein the profiling is per-class global value profiling.

18. The non-transitory computer-readable medium of claim 16, wherein the profiling is per-site value profiling.

19. The non-transitory computer-readable medium of claim 16, wherein the profiling is per-site object value profiling.

20. The non-transitory computer-readable medium of claim 16, wherein the profile initialization function is specified using a special purpose declaration attribute.

* * * * *